United States Patent
Park et al.

(10) Patent No.: US 12,327,857 B2
(45) Date of Patent: Jun. 10, 2025

(54) ELECTRODE MANUFACTURING DEVICE

(71) Applicant: LG Energy Solution, Ltd., Seoul (KR)

(72) Inventors: Keum Yong Park, Daejeon (KR); Jeong Soo Seol, Daejeon (KR); Hwan Han Kim, Daejeon (KR); Jung Eun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 199 days.

(21) Appl. No.: 17/911,061

(22) PCT Filed: Nov. 18, 2021

(86) PCT No.: PCT/KR2021/016946
§ 371 (c)(1),
(2) Date: Sep. 12, 2022

(87) PCT Pub. No.: WO2022/108349
PCT Pub. Date: May 27, 2022

(65) Prior Publication Data
US 2023/0108451 A1   Apr. 6, 2023

(30) Foreign Application Priority Data

Nov. 18, 2020   (KR) .................. 10-2020-0154719

(51) Int. Cl.
*B30B 3/00* (2006.01)
*B21B 27/02* (2006.01)
*H01M 4/04* (2006.01)

(52) U.S. Cl.
CPC .......... *H01M 4/0435* (2013.01); *B21B 27/02* (2013.01); *B30B 3/00* (2013.01); *B30B 3/005* (2013.01);
(Continued)

(58) Field of Classification Search
CPC .. B30B 3/00; B30B 3/02; B30B 3/005; B30B 3/04; B21B 27/02; B21B 2267/06;
(Continued)

(56) References Cited

U.S. PATENT DOCUMENTS 5,287,715 A     2/1994  Kusaba
10,062,920 B2 * 8/2018  Umeda ................. B05C 19/008
(Continued)

FOREIGN PATENT DOCUMENTS

CN      1065609 A       10/1992
CN      1229699 A   *    9/1999  ........... B21B 13/142
(Continued)

OTHER PUBLICATIONS

Search report from International Application No. PCT/KR2021/016946, mailed Mar. 4, 2022.
(Continued)

*Primary Examiner* — Jimmy T Nguyen
(74) *Attorney, Agent, or Firm* — Lerner David LLP

(57) ABSTRACT

An electrode manufacturing device is provided. The electrode manufacturing device includes a pressing roll configured to apply pressure to an uncoated part of the electrode, wherein the pressing roll comprises a central part, a first end part and a second end part, wherein the uncoated part comprises an insulating coated part and a non-insulating coated part, wherein the first end part is adjacent to a boundary between the insulating coated part and the non-insulating coated part, wherein the second end part is located at a portion far away from the insulating coated part, and wherein a first outer diameter of the central part connected to the first end part is greater than a second outer diameter of the central part connected to the second end part.

10 Claims, 5 Drawing Sheets

(52) U.S. Cl.
CPC ....... *B21B 2267/06* (2013.01); *B21B 2267/18* (2013.01)

(58) Field of Classification Search
CPC ............. B21B 2267/18; H01M 4/0435; B05C 11/025; B05C 9/12; Y02E 60/10
See application file for complete search history.

(56) References Cited

U.S. PATENT DOCUMENTS

| | | |
|---|---|---|
| 2005/0145360 A1 | 7/2005 | Hikida |
| 2012/0288749 A1 | 11/2012 | Kim |
| 2013/0228082 A1* | 9/2013 | Honjou .............. H01M 4/0435 492/2 |
| 2018/0226630 A1 | 8/2018 | Yanai et al. |
| 2020/0194772 A1 | 6/2020 | Yanai et al. |

FOREIGN PATENT DOCUMENTS

| | | | |
|---|---|---|---|
| CN | 103209824 A | 7/2013 | |
| CN | 104143628 A | 11/2014 | |
| CN | 106571443 A | 4/2017 | |
| CN | 107646150 A | 1/2018 | |
| CN | 110010847 A | 7/2019 | |
| CN | 111342000 A | 6/2020 | |
| JP | 60170516 A * | 9/1985 | ............. B21B 37/32 |
| JP | 03013219 A * | 1/1991 | ........... B21B 13/142 |
| JP | 2012069266 A | 4/2012 | |
| JP | 2014103068 A | 6/2014 | |
| JP | 2014116141 A | 6/2014 | |
| JP | 2014120273 A | 6/2014 | |
| JP | 2014123491 A | 7/2014 | |
| JP | 5760366 B2 | 8/2015 | |
| JP | 2018156839 A | 10/2018 | |
| JP | 2019033041 A | 2/2019 | |
| JP | 6539080 B2 | 7/2019 | |
| KR | 100612636 B1 | 8/2006 | |
| KR | 101182892 B1 | 9/2012 | |
| KR | 101555697 B1 | 9/2015 | |
| KR | 20190004759 A | 1/2019 | |
| KR | 20200006816 A | 1/2020 | |
| KR | 20200075558 A | 6/2020 | |
| KR | 20210144585 A | 11/2021 | |
| KR | 20210144586 A | 11/2021 | |

OTHER PUBLICATIONS

Extended European Search Report including Written Opinion for Application No. 21895117.6 dated Jun. 27, 2024, pp. 1-10.

* cited by examiner

[FIG. 1]
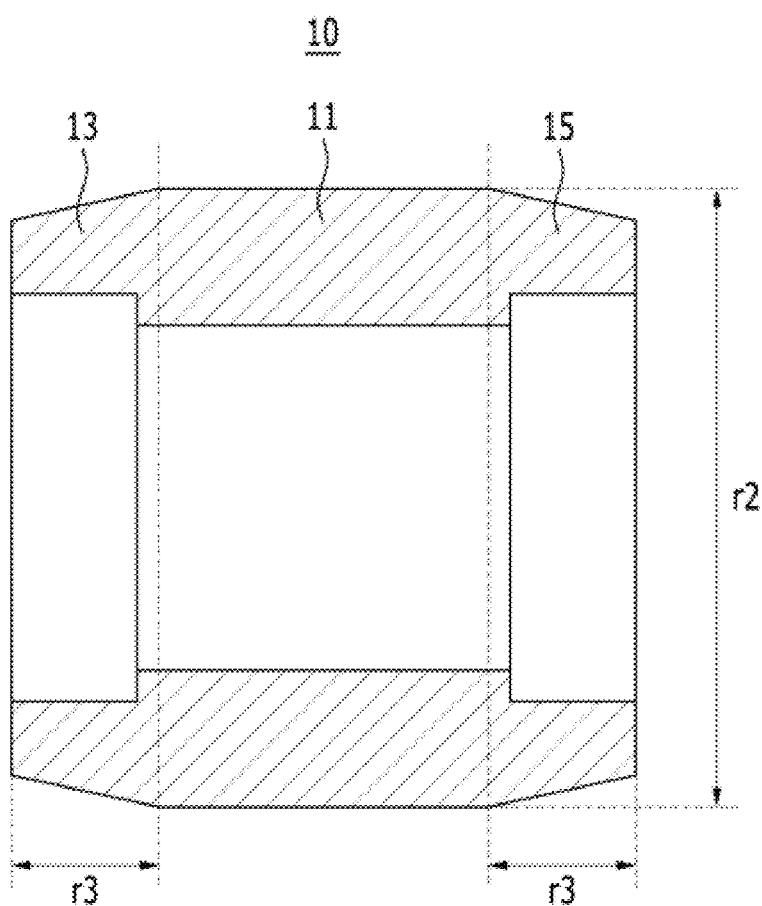
Prior Art

[FIG. 2]
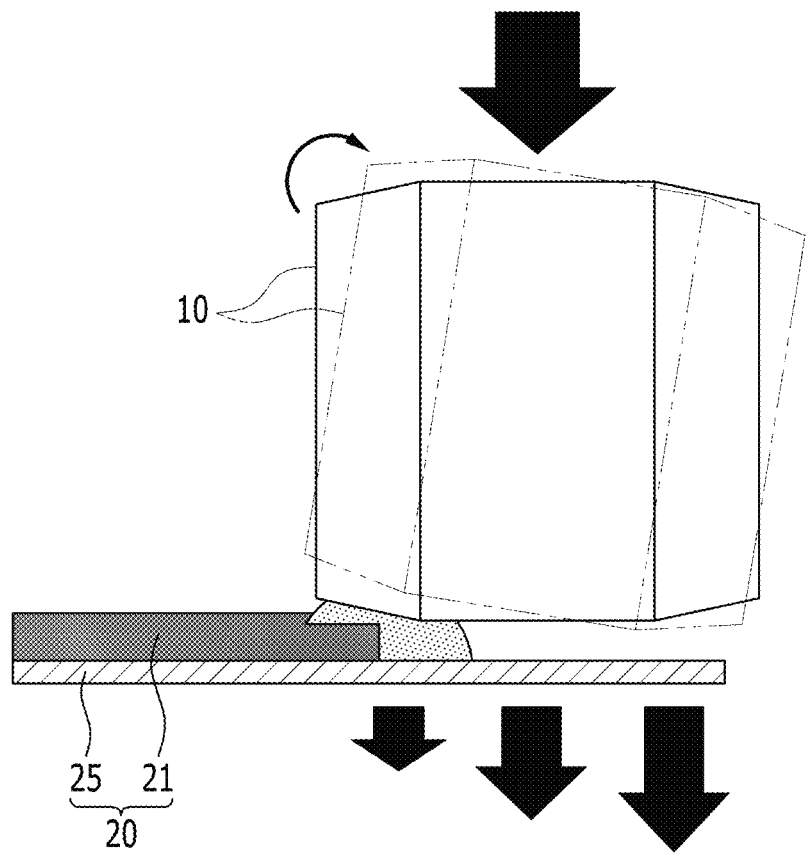
Prior Art

[FIG. 3]
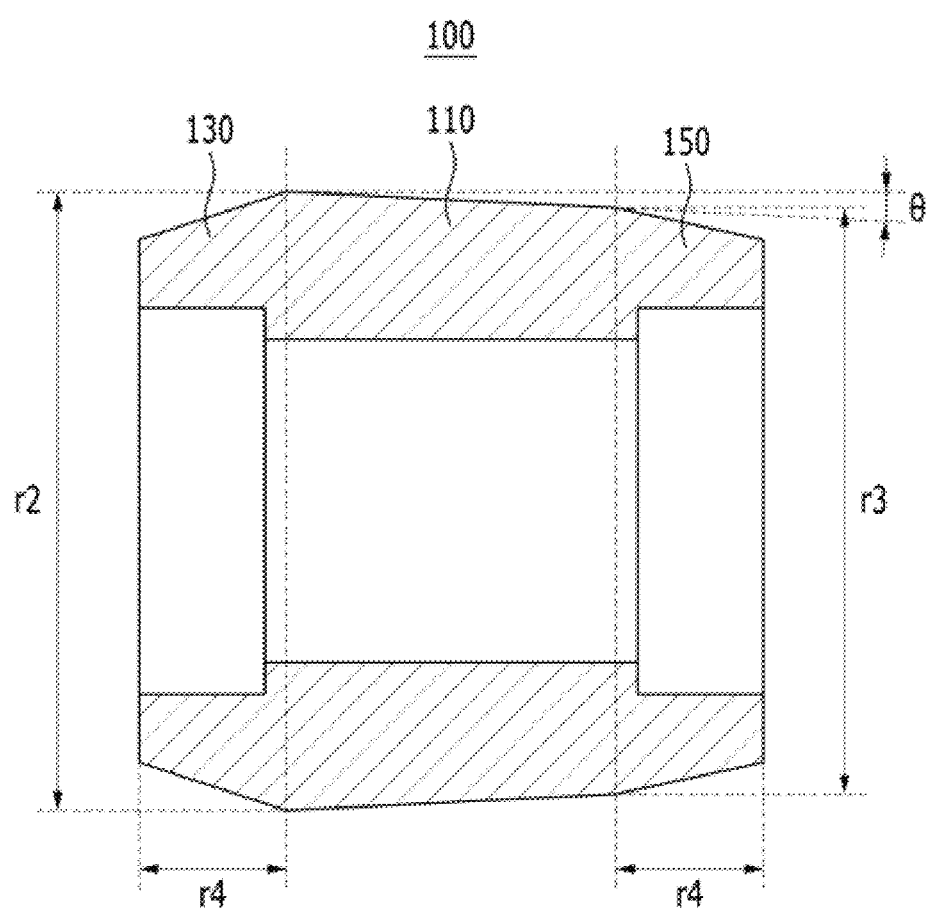

[FIG. 4]
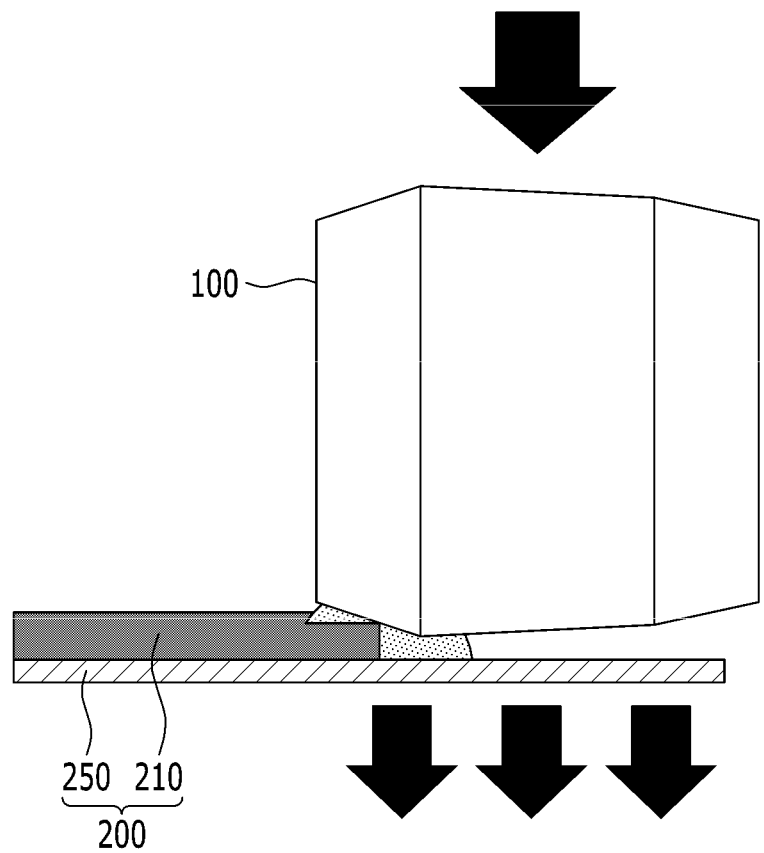
[FIG. 5]
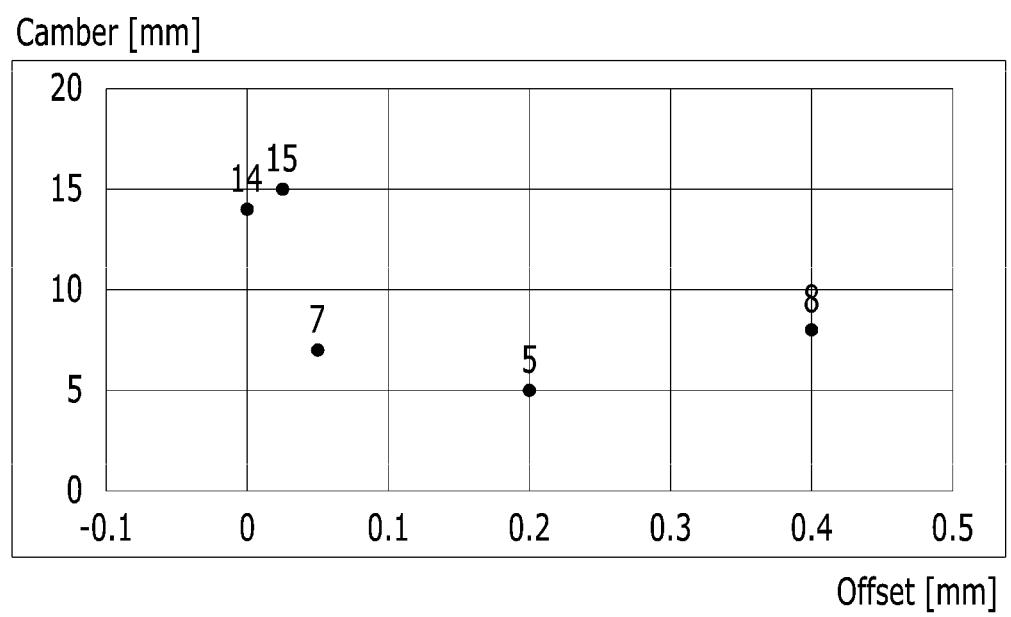

[FIG. 6]
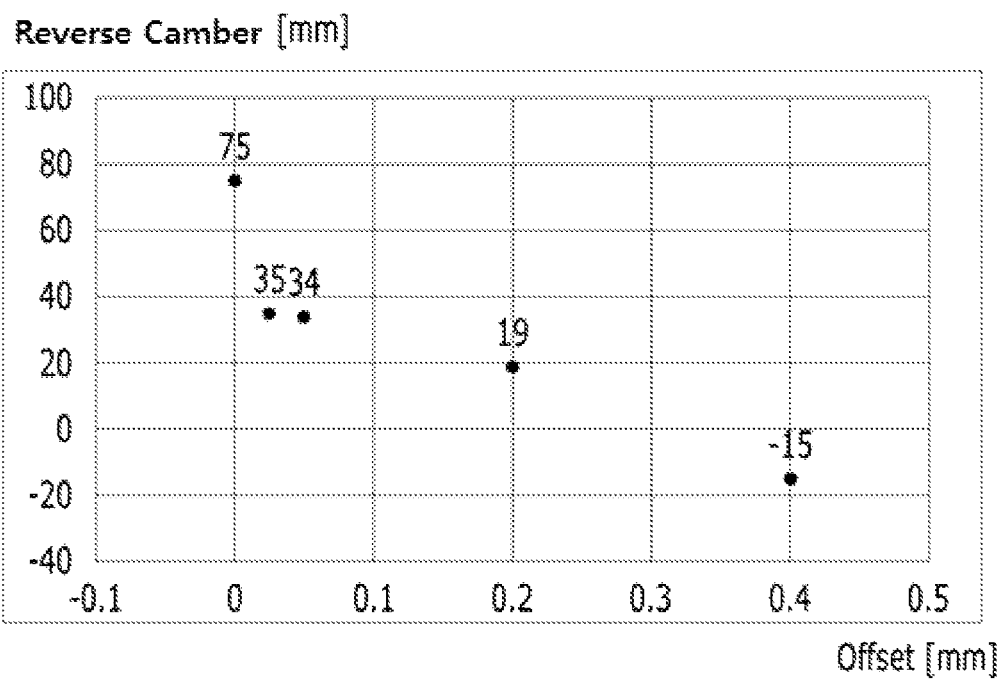
[FIG. 7]
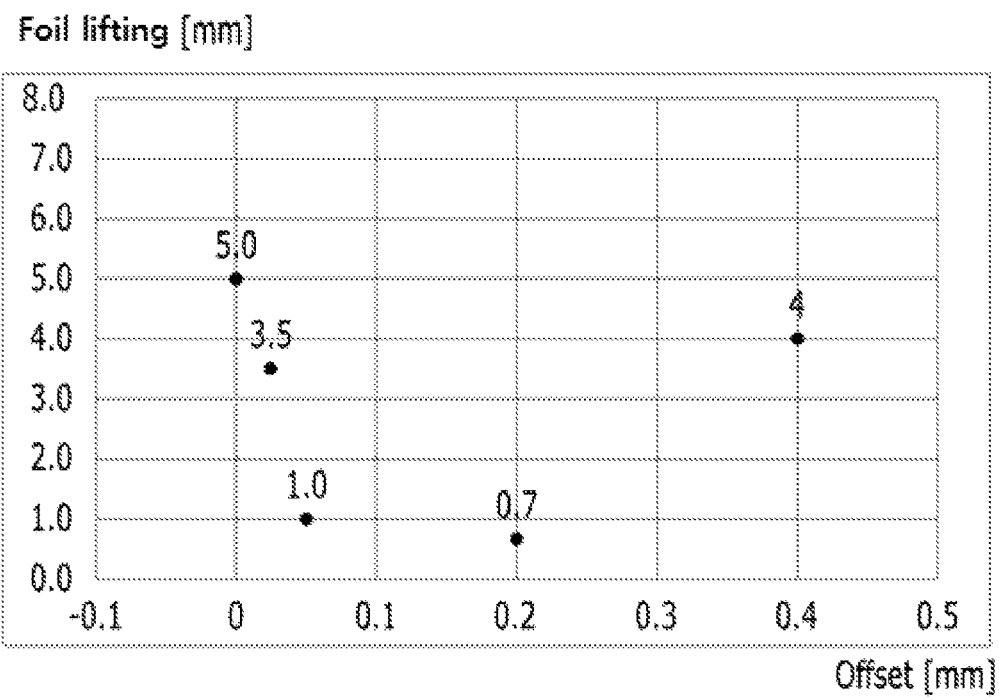

ELECTRODE MANUFACTURING DEVICE

CROSS-REFERENCE TO RELATED APPLICATIONS

The present application is a national phase entry under 35 U.S.C. § 371 of International Application No. PCT/KR2021/016946, filed on Nov. 18, 2021, which claims the benefit of and priority of Korean Patent Application No. 10-2020-0154719 filed on Nov. 18, 2020, all of which are incorporated herein by reference.

TECHNICAL FIELD

The present disclosure relates to an electrode manufacturing device, and more particularly, to an electrode manufacturing device which applies uniform pressure between a coated part and an uncoated part of the electrode to reduce deviation of stretching rate.

BACKGROUND

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

The secondary battery can be formed by inserting an electrode assembly composed of a positive electrode, a negative electrode, and a separator into a case, and then sealing the case. Here, the electrode for secondary battery, such as a positive electrode or a negative electrode, includes a coated part and an uncoated part on the current collector, the coated part is formed with an active material layer coated with an active material slurry, and the uncoated part corresponds to a plain portion on which the active material slurry is not coated. Here, the uncoated part includes an insulating coated part that is coated with an insulating material and a non-insulating coated part that is not coated with an insulating material. Particularly, in the case of the uncoated part, there is a problem that folding, wrinkles or the like may occur in the electrode manufacturing process, and an additional pressing process is required.

FIG. 1 is a cross-sectional view showing a conventional electrode manufacturing device. FIG. 2 is a diagram showing the electrode manufacturing device of FIG. 1 used for an uncoated part of the electrode.

Referring to FIG. 1, a conventional electrode manufacturing device includes a pressing roll 10, wherein the pressing roll 10 includes a central part 11, a first end part 13, and a second end part 15. Here, in the electrode manufacturing device 10, the outer surface of the central part 11 is parallel to the horizontal plane, and the outer diameter r2 of the central part 11 connected to the first end part 13 and the outer diameter r2 of the central part 11 connected to the second end part 15 are identical to each other.

Referring to FIG. 2, the first end part 130 of the conventional pressing roll 10 is located adjacent to the boundary between the insulating coated part 21 and the non-insulating coated part 25 formed on the uncoated part 20 of the electrode for secondary battery. Here, the conventional pressing roll 10 descends toward the uncoated part 20 and applies pressure to the insulating coated part 21 and the non-insulating coated part 25.

However, the insulating coated part 21 and the non-insulating coated part 25 differ in thickness, and thus the first end part 13 of the conventional pressing roll 10 causes a lifting phenomenon unlike the second end part 15. That is, the distribution of the force applied to the uncoated part 20 by the conventional pressing roll 10 can be formed non-uniformly, and the deviation of stretching rate in the uncoated part 20 may also be increased. Therefore, there is a need to the pressing roll 10 in which the deviation of stretching rate is reduced, unlike the conventional case.

DETAILED DESCRIPTION OF THE INVENTION

Technical Problem

It is an object of the present disclosure to provide an electrode manufacturing device which applies uniform pressure between a coated part and an uncoated part of the electrode to reduce deviation of stretching rate.

The objects of the present disclosure are not limited to the aforementioned objects, and other objects which are not described herein should be clearly understood by those skilled in the art from the following detailed description and the accompanying drawings.

Technical Solution

According to one aspect of the present disclosure, there is provided an electrode manufacturing device comprising a pressing roll that applies pressure to an uncoated part of the electrode, wherein the pressing roll comprises a central part, a first end part and a second end part, wherein the uncoated part comprises an insulating coated part and a non-insulating coated part, wherein the first end part is adjacent to a boundary between the insulating coated part and the non-insulating coated part, wherein the second end part is located at a portion far away from the insulating coated part, and wherein a first outer diameter of the central part connected to the first end part is greater than a second outer diameter of the central part connected to the second end part.

The first end part and the second end part may have the same width.

The first end part and the second end part may be decreased in the outer diameter toward the outside from the central part.

A taper angle of an outer surface of the first end part may be greater than a taper angle of an outer surface of the second end part.

An outer diameter of the second end part far away from the central part may be less than or equal to an outer diameter of the first end part far away from the central part.

A ratio of the first outer diameter to the second outer diameter may be 1.0001 or more and 1.01 or less.

The difference between the first outer diameter and the second outer diameter may be 0.03 mm or more and 0.399 mm or less.

The outer surface of the central part may extend from the first end part to the second end part, wherein the taper angle of the outer surface of the central part may be 0.1 degrees or more and 0.759 degrees or less.

The central part, the first end part and the second end part may be integrated.

The pressing roll may transfer a serrated shape to the uncoated part.

An outer surface of at least one of the central part, the first end part, and the second end part may be formed in a serrated shape.

According to one aspect of the present disclosure, there is provided an electrode for a secondary battery manufactured by the above-mentioned electrode manufacturing device.

Advantageous Effects

According to embodiments, the present disclosure provides an electrode manufacturing device in which the outer diameters of the central part connected to both end parts of the pressing roll are different from each other, so that a uniform pressure can applied between the coated part and the uncoated part of the electrode, thereby reducing deviation of stretching rate.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a cross-sectional view showing a conventional electrode manufacturing device;

FIG. 2 is a diagram showing an electrode manufacturing device of FIG. 1 used for an uncoated part of the electrode;

FIG. 3 is a cross-sectional view showing an electrode manufacturing device according to an embodiment of the present disclosure;

FIG. 4 is a diagram showing an electrode manufacturing device of FIG. 3 used for the uncoated part of the electrode; and FIGS. 5 to 7 are diagrams showing experimental data of electrodes manufactured by the electrode manufacturing device of FIG. 3.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" or "comprising" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Hereinafter, an electrode manufacturing device according to an embodiment of the present disclosure will be described. However, one end part of the electrode for a secondary battery will be mainly described herein, without being limited thereto, and the other end will be described with the same or similar contents. Additionally, here, the electrode will be described with reference to the upper surface of the upper and lower surfaces of the current collector, but is not necessarily limited thereto, and even in the case of the lower surface, it will be described with the same or similar contents.

FIG. 3 is a cross-sectional view showing an electrode manufacturing device according to an embodiment of the present disclosure. FIG. 4 is a diagram showing the electrode manufacturing device of FIG. 3 used for the uncoated part of the electrode.

Referring to FIGS. 3 and 4, an electrode manufacturing device according to an embodiment of the present disclosure includes a pressing roll 100 that applies pressure to an uncoated part 200 of the electrode, wherein the pressing roll 100 includes a central part 110, a first end part 130 and a second end part 150. Here, the uncoated part 200 includes an insulating coated part 210 and a non-insulating coated part 250, the first end part 130 is adjacent to a boundary between the insulating coated part 210 and the non-insulating coated part 250, and the second end part 150 may be located at a portion far away from the insulating coated part 210.

The pressing roll 100 may be configured such that the central part 110, the first end part 130 and the second end part 150 are integrated. In one example, the pressing roll 100 allows the first end part 130 and the second end part 150 to be processed through an additional process on the basis of the central part 110. Alternatively, in the pressing roll 100, a central part 110, a first end part 130, and a second end part 150 are separately manufactured, and in accordance with an additional process, the central part 110, the first end part 130, and the second end part 150 may be coupled to each other. However, the present disclosure is not limited thereto, and the pressing roll 100 may be manufactured by various methods.

Further, at least one outer surface of the central part 110, the first end part 130, and the second end part 150 of the pressing roll 100 is formed in a serrated shape, so that as the pressing roll 100 applies pressure to the uncoated part 200, the pressing roll 100 can transfer the serrated shape to the uncoated part 200. Thereby, the pressing roll 100 can increase the stretching rate of the uncoated part 200, or can alleviate wrinkles of the uncoated part 200, and can suppress the occurrence of folding. However, the shape formed on the outer surface of the pressing roll 100 is not limited thereto, and the outer surface of the pressing roll 100 may be formed in a prescribed shape.

In the pressing roll 100, the first outer diameter r2 of the central part 110 connected to the first end part 130 and the second outer diameter r3 of the central part 110 connected to the second end part 150 may be different from each other. More preferably, the first outer diameter r2 of the central part 110 connected to the first end part 130 may be greater than the second outer diameter r3 of the central part 110 connected to the second end part 150.

Moreover, in the central part 110 of the pressing roll 100, a ratio of the first outer diameter r2 to the second outer diameter r3 may be 1.0001 or more and 1.01 or less. More specifically, in the central part 110 of the pressing roll 100, a ratio of the first outer diameter r2 to the second outer diameter r3 may be 1.0015 or more and 1.0097 or less. In one example, in the central part 110 of the pressing roll 100, a ratio of the first outer diameter r2 to the second outer diameter r3 may be 1.0025 or more and 1.0087 or less.

Thereby, in the central part 110 of the pressing roll 100 according to the present embodiment, when a ratio of the first outer diameter r2 to the second outer diameter r3 satisfies the above-mentioned range, the pressing roll 100 may be applied with a greater load toward the first end part 130 with respect to the central part 110 than in the conventional case. Thus, even if the pressing roll 100 descends toward the uncoated part 200 and applies pressure, it is possible to suppress a phenomenon in which the first end part 110 adjacent to the boundary between the insulating coated part 210 and the non-insulating coated part 250 in the uncoated part 200 is lifted. Additionally, the deviation of stretching rate of the insulating coated part 210 and the non-insulating coated part 250 in the uncoated part 200 can also be reduced, and the waviness level can also be reduced by uniform stretching rate.

On the other hand, when a ratio of the first outer diameter to the second outer diameter r3 is less than 1.0001 or greater than 1.0097, in the central part 110 of the pressing roll 100, the pressing roll 100 is not applied with a sufficient load or is applied with an excessive load toward the first end part 130 with respect to the central part 110, which causes a problem that the deviation of stretching rate of the insulating coated part 210 and the non-insulating coated part 250 is still generated in the uncoated part 200.

Further, in the central part 110 of the pressing roll 100, the difference between the first outer diameter r2 and the second outer diameter r3 may be 0.03 mm or more and 0.399 mm or less. More specifically, the difference between the first outer diameter r2 and the second outer diameter r3 may be 0.04 mm or more and 0.39 mm or less. In one example, the difference between the first outer diameter r2 and the second outer diameter r3 may be 0.05 mm or more and 0.35 mm or less.

Thereby, in the central part 110 of the pressing roll 100 according to the present embodiment, when the difference between the first outer diameter r2 and the second outer diameter r3 satisfies the above-mentioned range, the pressing roll 100 may be applied with a greater load toward the first end part 130 with respect to the central part 110 than in the related art. Accordingly, the pressing roll 100 can suppress the phenomenon that the first end part 130 is lifted. Further, the deviation of stretching rate in the uncoated part 200 can also be reduced, and the waviness level can also be reduced by the uniform stretching rate.

On the other hand, in the central part 110 of the pressing roll 100, when the difference between the first outer diameter r2 and the second outer diameter r3 is less than 0.03 mm or greater than 0.399 mm, the pressing roll 100 is not applied with a sufficient load or is applied with an excessive load toward the first end part 130 with respect to the central part 110, which causes a problem that the deviation of stretching rate of the insulating coated part 210 and the non-insulating coated part 250 is still generated in the uncoated part 200.

Further, in the central part 110 of the pressing roll 100 according to the present embodiment, the outer surface of the central part 110 is extended from the first end part 130 to the second end part 150, wherein the taper angle of the outer surface of the central part 110 may be 0.1 degrees or more and 0.759 degrees or less. More specifically, in the central part 110 of the pressing roll 100, the taper angle of the outer surface may be 0.14 degrees or more and 0.73 degrees or less. In one example, in the central part 110 of the pressing roll 100, the taper angle of the outer surface may be 0.19 degrees or more and 0.70 degrees or less.

Therefore, in the central part 110 of the pressing roll 100 according to the present embodiment, when the taper angle of the outer surface of the central part 110 satisfies the above-mentioned range, the pressing roll 100 may be applied with a greater load toward the first end part 130 with respect to the central part 110 than in the conventional case. Thereby, the pressing roll 100 can suppress the phenomenon that the first end part 130 is lifted. Further, the deviation of stretching rate within the uncoated part 200 can be reduced, and the waviness level can also be reduced by the uniform stretching rate.

On the other hand, in the central part 110 of the pressing roll 100 according to the present embodiment, when the taper angle of the outer surface of the central part 110 is less than 0.1 degrees or more than 0.759 degrees, the pressing roll 100 is not applied with a sufficient load or is applied with an excessive load toward the first end part 130 with respect to the central part 110, which causes a problem that the deviation of stretching rate of the insulating coated part 210 and the non-insulating coated part 250 is still generated in the uncoated part 200.

Further, in the pressing roll 100, the width r4 of the first end part 130 and the width r4 of the second end part 150 may be different or the same. More preferably, the width r4 of the first end part 130 and the width r4 of the second end part 150 may be identical to each other.

Further, the first end part 130 and the second end part 150 may be decreased in the outer diameter toward the outside from the central part 110. Here, the taper angle of the outer surface of the first end part 130 may be greater than the taper angle of the outer surface of the second end part 150.

Further, the outer diameter of the first end part 130 far away from the central part 110 and the outer diameter of the second end part 150 far away from the center 110 may be different or the same. More preferably, the outer diameter of the second end part 150 farther from the central part 110 may be smaller than or the same as the outer diameter of the first end part 130 farther from the central part 110.

Thereby, the pressing roll 100 has an advantage that it is uniformly stretched without causing a step at the boundary between the insulating coated part 210 and the non-insulating coated part 250 in the uncoated part 200.

The electrode for a secondary battery according to another embodiment of the present disclosure can be manufactured by the above-mentioned electrode manufacturing device. The electrode for a secondary battery manufactured by the electrode manufacturing device described above may be applied to various secondary batteries. These secondary batteries may include a cylindrical battery in which the electrode assembly is built in a cylindrical metal can, a prismatic battery in which the electrode assembly is built in a prismatic metal can, and a pouch-type battery in which the electrode assembly is built in a pouch-type case of an aluminum laminated sheet, but the present disclosure is not limited thereto, and it is applicable to various secondary batteries in which the electrode for secondary batteries can be used, which also falls within the scope of the present disclosure.

Next, the contents of the present disclosure will be described by way of examples, but the following examples are for illustrative purposes only, and the scope of the present disclosure is not limited thereto.

Referring to Table 1, in Example 1, a pressing roll, in which the first outer diameter r2 of the central part 110 connected to the first end part 130 is 40.025 mm, and second outer diameter r3 of the central part 110 connected to the second end part 150 is 40 mm, is manufactured, wherein the taper angle of the outer surface of the central part 110 is 0.04 degrees.

Example 2 is the same as in Example 1, except that in Example 2, the first outer diameter r2 of the central part 110 connected to the first end part 130 is 40.05 mm, and the taper angle of the outer surface of the central part 110 is 0.1 degrees.

Example 3 is the same as in Example 1, except that in Example 3, the first outer diameter r2 of the central part 110 connected to the first end part 130 is 40.2 mm, and the taper angle of the outer surface of the central part 110 is 0.38 degrees.

Example 4 is the same as in Example 1, except that in Example 4, the first outer diameter r2 of the central part 110 connected to the first end part 130 is 40.3 mm, and the taper angle of the outer surface of the central part 110 is 0.57 degrees.

Example 5 is the same as in Example 1, except that in Example 5, the first outer diameter r2 of the central part 110 connected to the first end part 130 is 40.4 mm, and the taper angle of the outer surface of the central part 110 is 0.76 degrees.

Comparative Example is the same as in Example 1, the first outer diameter r2 of the central part 110 connected to the first end part 130 is 40 mm, and the taper angle of the outer surface of the central part 110 is 0 degrees.

TABLE 1

|  | First outer diameter (mm) | Second outer diameter (mm) | Offset (mm) | Taper angle (°) |
| --- | --- | --- | --- | --- |
| Comparative Example | 40 | 40 | 0 | 0 |
| Example 1 | 40.02 | 40 | 0.025 | 0.04 |
| Example 2 | 40.05 | 40 | 0.05 | 0.1 |
| Example 3 | 40.2 | 40 | 0.2 | 0.38 |
| Example 4 | 40.3 | 40 | 0.3 | 0.57 |
| Example 5 | 40.4 | 40 | 0.4 | 0.76 |

Experimental Example

For the uncoated part of the electrode manufactured in the same way, a pressing process was performed using the pressing rolls prepared in Examples 1 to 3, Examples 5 and Comparative Examples, and the camber, reverse camber, and foil lifting of each electrode subjected to the pressing process were measured, respectively.

Here, the length of the manufactured electrode was prepared in a range of 1.2 m to 1.25 m, and sampled with a width of 20 mm on the basis of the boundary surface between the coated part and the uncoated part of the electrode. Thereby, a camber measurement specimen was prepared.

Here, the coated part of the electrode means an active material layer. One end of the prepared camber measurement specimen was fixed using an electrode fixing clamp, and a roller was contacted and travelled on the specimen. Then, the camber degree of the other end part of the specimen was measured, and the results are shown in FIG. 5.

Additionally, the length of the manufactured electrode was prepared to be in a range of 1.2 m to 1.25 m, and the uncoated part of the electrode was cut along the boundary surface between the coated part and the uncoated part of the electrode. Thereby, a reverse camber measurement specimen was prepared. One end of the prepared reverse camber measurement specimen was fixed using an electrode fixing clamp, and a roller was contacted and travelled on the specimen. Then, the degree of reverse camber of the other end of the specimen was measured, and the results are shown in FIG. 6.

Further, the length of the manufactured electrode was prepared to be in a range of 0.2 m to 0.25 m to prepare a foil lifting specimen. In the prepared foil lifting specimen, a 20 cm ruler was placed on the coated part of the electrode along the boundary surface between the coated part and the uncoated part of the electrode, and the degree of lifting of the foil from the bottom surface was measured while pressing the electrode, and the results are shown in FIG. 7.

Referring to FIGS. 5 and 7, it can be confirmed that in Examples 1 to 3, as the offset between the first outer diameter and the second outer diameter increases, the camber and foil lifting level gradually decreases as a whole, unlike Comparative Example. Therefore, when the first outer diameter and the second outer diameter have a difference as in Examples 1 to 3, the amount of stretching of the uncoated part 200 is excellent, and electrode waviness and deviation of stretching rate are also reduced.

In addition, referring to FIG. 6, it can be confirmed that in Examples 1 to 3, as the offset between the first outer diameter and the second outer diameter increases, the reverse camber level gradually decreases as a whole, unlike Comparative Example. Thereby, in the case of Examples 1 to 3, it is possible to prevent the uncoated part 200 from being folded in the rolling/slitting process and also to reduce the degree of defects generated in the notching process.

In particular, it can be confirmed that in the case of Example 3, the camber, reverse camber, and foil lifting levels are all lowest, the amount of stretching and the deviation of stretching rate are also the best, and the effect of preventing defects in the process is also excellent.

However, when the difference between the first outer diameter and the second outer diameter is excessively large as in Example 5, the camber and foil lifting levels have smaller values than those of Comparative Example, but the reverse camber has a negative value. From these points, it can be confirmed that a pressing phenomenon of the insulating coated part 210 side of the uncoated part 200 appears severely.

Although preferred embodiments of the present disclosure have been shown and described above, the scope of the present disclosure is not limited thereto, and numerous other variations and modifications can be designed by those skilled in the art using the basic principles of the invention defined in the appended claims, which also fall under the spirit and scope of the invention.

DESCRIPTION OF REFERENCE NUMERALS

100: pressing roll
110: central part
130: first end part
150: second end part
200: uncoated part
210: insulation coated part
250: non-insulating coated part

The invention claimed is:
1. An electrode manufacturing device comprising:
a pressing roll configured to apply pressure to an uncoated part of an electrode,
wherein the pressing roll comprises a central part, a first end part and a second end part, wherein the uncoated part comprises an insulating coated part and a non-insulating coated part, wherein the first end part is adjacent to a boundary between the insulating coated part and the non-insulating coated part, wherein the second end part is located at a portion far away from the insulating coated part, wherein a first outer diameter of the central part connected to the first end part is greater than a second outer diameter of the central part connected to the second end part, and wherein the first end part and the second end part are decreased in outer diameters toward an outside from the central part.

2. The electrode manufacturing device of claim 1, wherein the first end part and the second end part have the same width.

3. The electrode manufacturing device of claim 1, wherein a taper angle of an outer surface of the first end part is greater than a taper angle of an outer surface of the second end part.

4. The electrode manufacturing device of claim 1, wherein an outer diameter of the second end part far away from the central part is less than or equal to an outer diameter of the first end part far away from the central part.

5. The electrode manufacturing device of claim 1, wherein a ratio the first outer diameter to the second outer diameter is 1.0001 or more and 1.01 or less.

6. The electrode manufacturing device of claim 1, wherein the difference between the first outer diameter and the second outer diameter is 0.03 mm or more and 0.399 mm or less.

7. The electrode manufacturing device of claim 1, wherein an outer surface of the central part extends from the first end part to the second end part, wherein a taper angle of the outer surface of the central part is 0.1 degrees or more and 0.759 degrees or less.

8. The electrode manufacturing device of claim 1, wherein the central part, the first end part and the second end part are integrated.

9. The electrode manufacturing device of claim 1, wherein the pressing roll transfers a serrated shape to the uncoated part.

10. The electrode manufacturing device of claim 9, wherein an outer surface of at least one of the central part, the first end part, and the second end part is formed in a serrated shape.

* * * * *